US012706725B2

(12) United States Patent
Zhang et al.

(10) Patent No.: US 12,706,725 B2
(45) Date of Patent: Aug. 11, 2026

(54) METHOD AND APPARATUS FOR PDCCH MONITORING

(71) Applicant: Lenovo (Beijing) Limited, Beijing (CN)

(72) Inventors: Yuantao Zhang, Beijing (CN); Yingying Li, Beijing (CN); Hongmei Liu, Beijing (CN); Zhi Yan, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 352 days.

(21) Appl. No.: 18/255,298

(22) PCT Filed: Dec. 4, 2020

(86) PCT No.: PCT/CN2020/133883

§ 371 (c)(1),
(2) Date: May 31, 2023

(87) PCT Pub. No.: WO2022/116146

PCT Pub. Date: Jun. 9, 2022

(65) Prior Publication Data

US 2024/0031112 A1 Jan. 25, 2024

(51) Int. Cl.
*H04L 5/00* (2006.01)
*H04W 72/23* (2023.01)

(52) U.S. Cl.
CPC .......... *H04L 5/0094* (2013.01); *H04L 5/0053* (2013.01); *H04W 72/23* (2023.01)

(58) Field of Classification Search
CPC ... H04L 5/0094; H04L 5/0053; H04L 5/0048; H04W 72/23
See application file for complete search history.

(56) References Cited

U.S. PATENT DOCUMENTS

2015/0029910 A1* 1/2015 He ...................... H04W 72/541 370/280
2019/0222357 A1* 7/2019 Huang ............. H04W 72/0446
(Continued)

FOREIGN PATENT DOCUMENTS

CN 111567107 A 8/2020
WO WO-2020033652 A1 * 2/2020 .......... H04L 5/0051
(Continued)

OTHER PUBLICATIONS

3GPP TSG RAN WG1 Meeting #92, R1-1801533 Title: Remaining details on DCI content and formats (Year: 2018).*
(Continued)

*Primary Examiner* — Faruk Hamza
*Assistant Examiner* — Abusayeed M Haque
(74) *Attorney, Agent, or Firm* — FIG. 1 Patents

(57) ABSTRACT

The present application relates to a method and an apparatus for Physical Downlink Control Channel (PDCCH) monitoring. One embodiment of the subject application provides a method performed by a first type of user equipment (UE), which includes: receiving search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion; and determining a candidate set for each search space subset for PDCCH monitoring.

20 Claims, 7 Drawing Sheets

(56) References Cited

U.S. PATENT DOCUMENTS

2019/0223164 A1* 7/2019 He ........................ H04W 76/27
2019/0246395 A1* 8/2019 Huang .................. H04L 5/0003

FOREIGN PATENT DOCUMENTS

WO 2020043180 A1 3/2020
WO 2020206086 A1 10/2020

OTHER PUBLICATIONS

3GPP TSG RAN WG1 Meeting #90bis, R1-1717512 Title: Remaining details on group common PDCCH (Year: 2017).*
PCT/CN2020/133883 , "International Preliminary Report on Patentability", PCT Application No. PCT/CN2020/133883, Jun. 15, 2023, 6 pages.
PCT/CN2020/133883 , "International Search Report and Written Opinion", PCT Application No. PCT/CN2020/133883, Aug. 20, 2021, 7 pages.

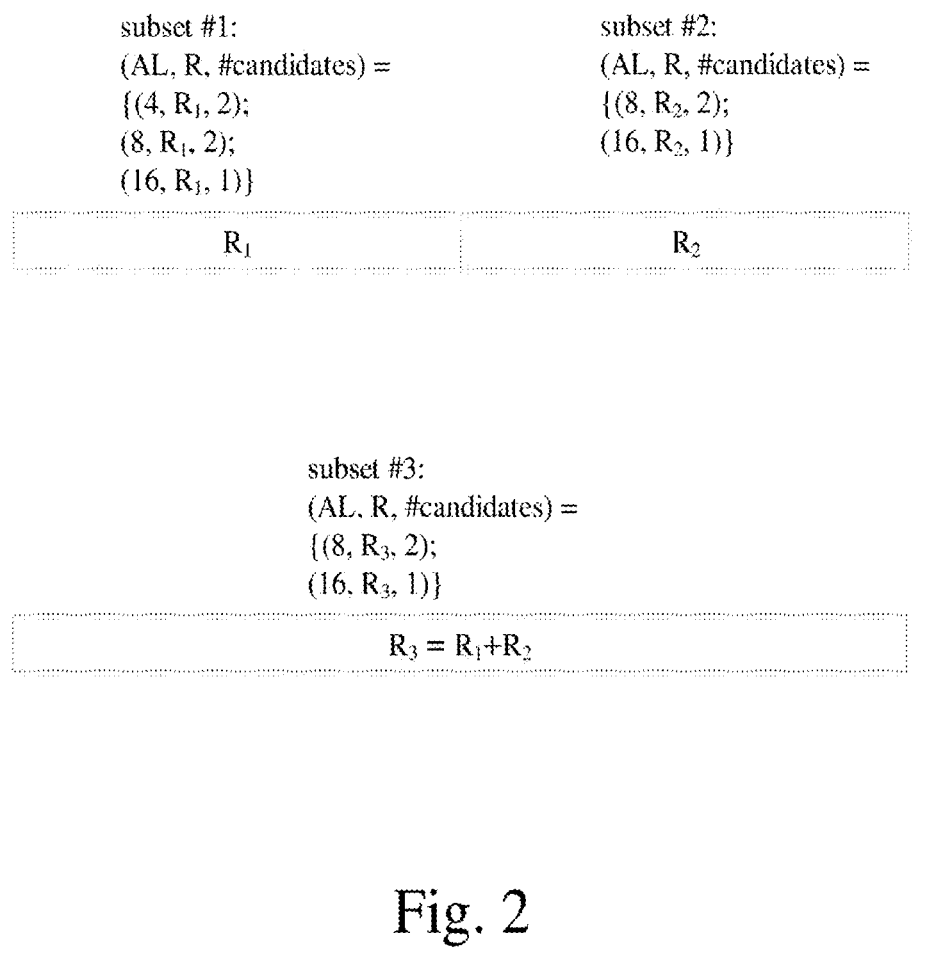

* cited by examiner subset #1:
(AL, R, #candidates) =
{(4, $R_1$, 2);
(8, $R_1$, 2);
(16, $R_1$, 1)} subset #2:
(AL, R, #candidates) =
{(8, $R_2$, 2);
(16, $R_2$, 1)}

| $R_1$ | $R_2$ |
|---|---|

subset #3:
(AL, R, #candidates) =
{(8, $R_3$, 2);
(16, $R_3$, 1)}

| $R_3 = R_1+R_2$ |
|---|

Fig. 2

METHOD AND APPARATUS FOR PDCCH MONITORING

TECHNICAL FIELD

The subject application relates to wireless communication technology, especially to a method and an apparatus for physical downlink control channel (PDCCH) monitoring.

BACKGROUND OF THE INVENTION

In 5G NR, the user equipment (UE) needs to monitor the PDCCH in the PDCCH monitoring occasions, because the PDCCH carries downlink control information (DCI) for downlink/uplink data scheduling, slot format indication, transmit power control (TPC) command, etc.

For a certain type of UEs that need coverage enhancement, for instance, the UEs with reduced capability (RedCap), i.e. RedCap UEs, PDCCH repetition is proposed for RedCap UEs to improve PDCCH detection performance. For the UEs with normal capability, for example, legacy enhanced Mobile Broadband (eMBB) UE or Ultra Reliable Low Latency Communications (URLLC) UEs, PDCCH repetition is not necessary. Herein the UEs need PDCCH repetition are the first type of UEs and the UEs without the need of PDCCH repetition are the second type of UEs.

However, in some scenarios, the PDCCH repetition for the first type of UEs needs to be performed in the PDCCH monitoring occasions for the second type of UEs. In such cases, the DCI needs to be transmitted at least in a PDCCH monitoring occasion for the first type of UEs, and repeated in other PDCCH monitoring occasions to improve the PDCCH detection performance for the second type of UEs.

Therefore, it is desirable to provide a solution for monitoring the PDCCH which takes the PDCCH repetition requirement of the first type of UEs into consideration, and does not degrade the performance of the second type of UEs too much.

SUMMARY

One embodiment of the subject application provides a method performed by a first type of user equipment (UE), which includes: receiving search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion; and determining a candidate set for each search space subset for PDCCH monitoring.

In one embodiment, the one or more search space subsets include an additional search space subset configured for at least two PDCCH monitoring occasion groups.

In one embodiment, the method further includes determining an additional search space subset based on the one or more search space subsets, wherein the additional search space subset is associated with a repetition level.

In one embodiment, each of the one or more search space subset is associated with a repetition level determined by the repetition level of the additional search space subset.

In one embodiment, the additional search space subset includes an aggregation level included in each of the one or more search space subsets.

In one embodiment, a candidate set for the additional search space subset includes at least a candidate which is associated with an aggregation level, and a repetition level, and is a combination of at least two candidates for the at least two PDCCH monitoring occasion groups, and wherein the at least two candidates are associated with a same aggregation level.

In one embodiment, the additional search space subset includes an aggregation level which is a combination of different aggregation levels included in the one or more search space subsets.

In one embodiment, the combination of different aggregation levels includes a first aggregation level associated with a PDCCH monitoring occasion group dedicated for the first type of UE, and a second aggregation level associated with a PDCCH monitoring occasion group shared by the first type of UE and a second type of UE.

In one embodiment, a candidate set for the additional search space subset includes at least a candidate which is a combination of at least two candidates for the at least two PDCCH monitoring occasion groups, and wherein the at least two candidates are associated with a same aggregation level and have a same candidate sequence.

In one embodiment, the candidate set for the additional search space subset further includes at least a candidate which is associated with an aggregation level, and a repetition level, and is a combination of at least two candidates for the at least two PDCCH monitoring occasion groups, and wherein the at least two candidates are associated with different aggregation levels.

In one embodiment, an aggregation level associated with the first type of UE is larger than an aggregation level associated with a second type of UE.

In one embodiment, the PDCCH monitoring occasion group includes a first PDCCH monitoring occasion group shared by both the first type of UE and a second type of UE.

In one embodiment, the PDCCH monitoring occasion group includes a second PDCCH monitoring occasion group dedicated for the first type of UE.

In one embodiment, a search space subset for a PDCCH monitoring occasion group dedicated for the first type of UE is a subset of a search space subset for a PDCCH monitoring occasion group dedicated for a second type of UE.

In one embodiment, the repetition level in the search space set is determined by a repetition level of a corresponding PDCCH monitoring group and an integer set.

In one embodiment, a duration, a periodicity, and/or an offset of each search space subset is configured independently.

In one embodiment, a duration of a search space subset dedicated for the first type of UE is a subset of a duration of a search space subset dedicated for a second type of UE.

In one embodiment, a periodicity of a search space subset dedicated for the first type of UE is an integer multiple of a periodicity of a search space subset dedicated for a second type of UE.

One embodiment of the subject application provides a method performed by a base station (BS), which includes: transmitting search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion; and determining a candidate set for each search space subset for PDCCH transmission.

In one embodiment, the method further includes determining an additional search space subset based on the one or more search space subsets, wherein the additional search space subset is associated with a repetition level.

In one embodiment, the one or more search space subsets include an additional search space subset for at least two PDCCH monitoring occasion groups.

In one embodiment, each of the one or more search space subset is associated with a repetition level determined by the repetition level of the additional search space subset.

In one embodiment, the additional search space subset includes an aggregation level included in each of the one or more search space subsets.

In one embodiment, a candidate set for the additional search space subset includes at least a candidate which is associated with an aggregation level, and a repetition level, and is a combination of at least two candidates for the at least two PDCCH monitoring occasion groups, and wherein the at least two candidates are associated with a same aggregation level.

In one embodiment, the additional search space subset includes an aggregation level which is a combination of different aggregation levels included in the one or more search space subsets.

In one embodiment, the combination of different aggregation levels includes a first aggregation level associated with a PDCCH monitoring occasion group dedicated for the first type of UE, and a second aggregation level associated with a PDCCH monitoring occasion group shared by the first type of UE and a second type of UE.

In one embodiment, a candidate set for the additional search space subset includes at least a candidate which is a combination of at least two candidates for the at least two PDCCH monitoring occasion groups, and wherein the at least two candidates are associated with a same aggregation level and have a same candidate sequence.

In one embodiment, the candidate set for the additional search space subset further includes at least a candidate which is associated with an aggregation level, and a repetition level, and is a combination of at least two candidates for the at least two PDCCH monitoring occasion groups, and wherein the at least two candidates are associated with different aggregation levels.

In one embodiment, an aggregation level associated with the first type of UE is larger than an aggregation level associated with a second type of UE.

In one embodiment, the PDCCH monitoring occasion group includes a first PDCCH monitoring occasion group shared by both the first type of UE and a second type of UE.

In one embodiment, the PDCCH monitoring occasion group includes a second PDCCH monitoring occasion group dedicated for the first type of UE.

In one embodiment, a search space subset for a PDCCH monitoring occasion group dedicated for the first type of UE is a subset of a search space subset for a PDCCH monitoring occasion group dedicated for a second type of UE.

In one embodiment, the repetition level in the search space set is determined by a repetition level of a corresponding PDCCH monitoring group and an integer set.

In one embodiment, a duration, a periodicity, and/or an offset of each search space subset is configured independently.

In one embodiment, a duration of a search space subset dedicated for the first type of UE is a subset of a duration of a search space subset dedicated for a second type of UE.

In one embodiment, a periodicity of a search space subset dedicated for the first type of UE is an integer multiple of a periodicity of a search space subset dedicated for a second type of UE.

Yet another embodiment of the subject application provides an apparatus, which includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a first type of user equipment (UE), which includes: receiving search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion; and determining a candidate set for each search space subset for PDCCH monitoring.

Still another embodiment of the subject application provides an apparatus, which includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a base station (BS), which includes: transmitting search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion; and determining a candidate set for each search space subset for PDCCH transmission.

BRIEF DESCRIPTION OF THE DRAWINGS

FIG. 2 illustrates an example of the three search space subsets according to some embodiments of the present disclosure.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments of the present disclosure provide a method and apparatus for PDCCH monitoring. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
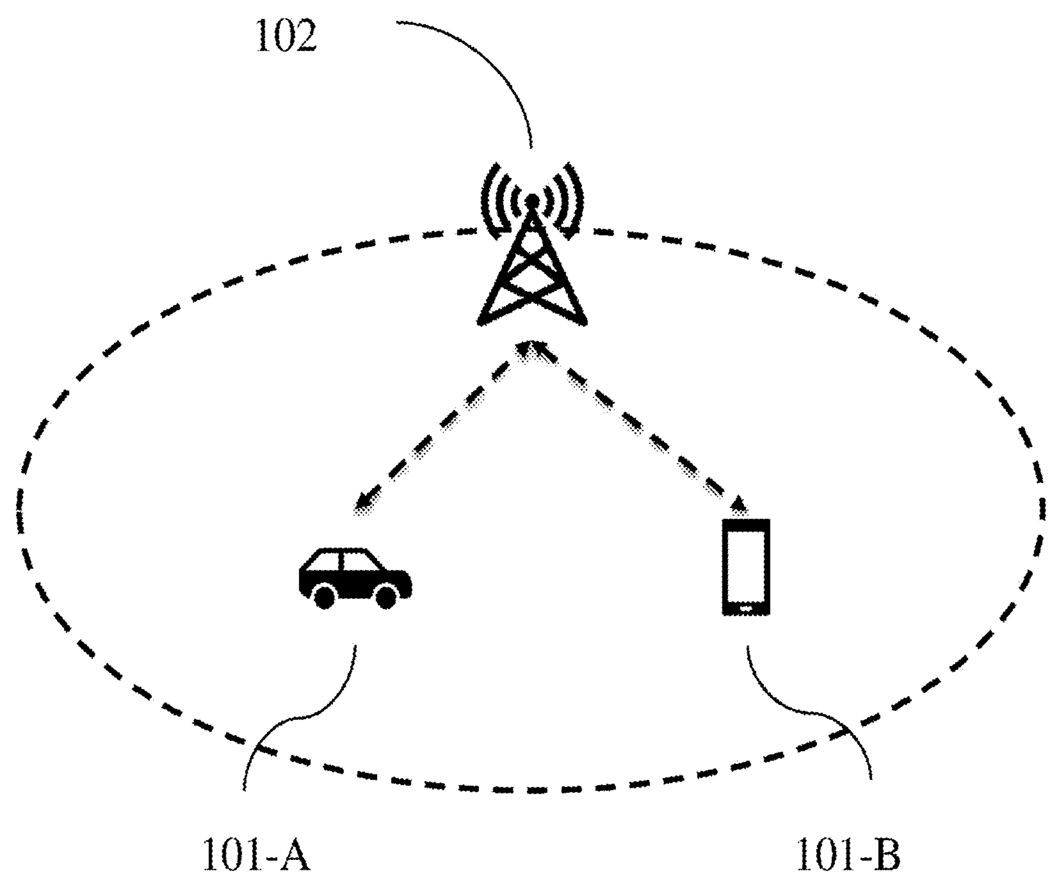
FIG. 1 illustrates a schematic diagram of a wireless communication system according to some embodiments of the present disclosure.

FIG. 1 illustrates an exemplary wireless communication system according to some embodiments of the present disclosure.

As shown in FIG. 1, the wireless communication system includes a base station, i.e., BS 102 and some UEs, i.e., UE 101-A and UE 101-B. UE 101-A and UE 101-B are within the coverage of BS 102. UE 101-A may be a first type of UE needs PDCCH repetition, e.g., a RedCap UE, and UE 101-B may be a second type of UE without the need of PDCCH repetition, e.g., a legacy eMBB or URLLC UE. It is contemplated that, in accordance with some other embodiments of the present application, a wireless communication system may include more or fewer BSs, and more or fewer UEs. Moreover, it is contemplated that names of UEs as illustrated and shown in FIG. 1 may be different, e.g., UE 101*c*, UE 104*f*, and UE 108*g* or the like.

In addition, although the RedCap UE, i.e. UE 101-A, as shown in FIG. 1 is illustrated in the shape of a car, it is contemplated that a communication system may include any type of RedCap UE in accordance with some other embodiments of the present application. For example, the UE 101-A may include industrial wireless sensors, video surveillances, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE 101-A may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101-A include wearable devices, such as smart watches, fitness bands, optical head-mounted displays, or the like. Moreover, the UE 101-A may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101-A may communicate directly with the BSs 102 via uplink (UL) communication signals.

Both UE 101-A and UE 101-B in the embodiments of FIG. 1 may transmit information to BS 102 and receive control information from BS 102, for example, via NR Uu interface. BS 102 may define one or more cells, and each cell may have a coverage area. As shown in FIG. 1, both UE 101-A and UE 101-B are within the coverage of BS 102.

BS 102 as illustrated and shown in FIG. 1 is not a specific base station, but may be any base station(s) in the communication system. For example, if the communication system includes two BSs 102, UE 101-A being within a coverage area of any one the two BSs 102 may be considered that UE 101-A is within a coverage of BS 102 in the communication system; and only UE 101-A being outside of coverage area(s) of both BSs 102 can be called as a case that UE 101-A is outside of the coverage of BS 102 in the communication system.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system is compatible with any type of network that is capable of sending and receiving wireless communication signals. For example, the wireless communication system is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3rd generation partnership project (3GPP)-based network, a 3GPP 5G network, a satellite communications network, a high altitude platform network, and/or other communications networks.

In one embodiment, the wireless communication system is compatible with the 5G new radio (NR) of the 3GPP protocol, wherein the BS 102 may transmit data using an orthogonal frequency division multiplexing (OFDM) modulation scheme on the DL and the UEs transmit data on the UL using a single-carrier frequency division multiple access (SC-FDMA) or OFDM scheme. More generally, however, the wireless communication system may implement some other open or proprietary communication protocols, for example, WiMAX, among other protocols.

In other embodiments, the BS 102 may communicate using other communication protocols, such as the IEEE 802.11 family of wireless communication protocols. Further, in some embodiments, the BS 102 may communicate over licensed spectrums, whereas in other embodiments the BS 102 may communicate over unlicensed spectrums. The present disclosure is not intended to be limited to the implementation of any particular wireless communication system architecture or protocol. In another embodiment, the BS 102 may communicate with the UEs using the 3GPP 5G protocols.

In wireless communications, for example, 5G NR, the PDCCH is transmitted from the BS to the UE in the PDCCH monitoring occasions, and the UE monitors the PDCCH in the PDCCH monitoring occasions. In each PDCCH monitoring occasion, the UE needs to detect a control resource set (CORESET), which defines a set of physical resources, i.e. the time domain resources and the frequency domain resources, for PDCCH or DCI detection.

The PDCCH monitoring occasions are configured in the search space set. A search space set is defined over an associated CORESET in each PDCCH monitoring occasion, and contains one or more search spaces, each of which corresponding to a control channel element (CCE) aggregation level (AL).

A CCE is the basic resource unit for PDCCH DCI reception and contains a certain resource (72 resource elements) in the CORESET. An aggregation level L means that L CCEs are aggregated for one DCI reception. Each aggregation level might be configured with one or more decoding candidates, each corresponding to the same number but different sets of CCEs.

At UE side, in each PDCCH monitoring occasion, it needs to detect each candidate of each AL in the configured search space set, to see if there is any DCI transmitted to the UE. At BS side, it may select one candidate of one AL for the DCI transmission according to, e.g., UE channel status, to guarantee the PDCCH could be detected by the UE with high probability (e.g., >=99%).

Typically, the higher the used AL, the better PDCCH detection performance. With up to AL=16 in one CORESET, the requirement of PDCCH detection performance (e.g., >=99% detection rate) could be fulfilled for the second type of UEs, e.g., the legacy eMBB or URLLC UEs. However, for the first type of UEs, e.g., the RedCap UE, the PDCCH detection performance is deteriorated due to reduced number of receive antennas at UE side. For example, the legacy UE includes 4 receive antennas, while the RedCap UE has 1 or 2 receive antennas. Therefore, when the RedCap UEs are in a bad coverage, e.g., in the cell edge, the requirement of PDCCH detection performance may not be fulfilled even with AL=16.

PDCCH repetition among the PDCCH monitoring occasions is proposed for the first type of UEs to improve PDCCH detection performance. Correspondingly, the search space set of the present disclosure is also defined for the first type of UEs to enable efficient PDCCH reception in case of PDCCH repetition.

If the BS configures dedicated PDCCH monitoring occasions for the first type of UEs, the search space set could be defined on these PDCCH monitoring occasions, and there is no impact for the PDCCH reception for the second type of UEs.

However, in some scenarios, the PDCCH repetition for the first type of UEs needs to include at least one PDCCH monitoring occasion for the second type of UEs. For instance, some DCI needs to be received by both the first type of UEs and the second type of UEs. As one example, the DCI for scheduling Msg2 in the random-access procedure, where Msg2 is shared by the legacy eMBB or URLLC UEs and the RedCap UEs. As another example, for the DCI for paging transmission, and the paging message contains paging records for both the legacy UEs and the RedCap UEs. In such cases, the DCI needs to be transmitted at least in a PDCCH monitoring occasion for the second type of UEs, e.g., the eMBB or URLLC UEs, and repeated in other PDCCH monitoring occasion(s) to improve the PDCCH detection performance for the first type of UEs, e.g., the RedCap UEs.

The search space set for the first type of UEs in such cases shall consider the impact for the second type of UEs on the PDCCH reception. It is desired that the performance of the second type of UEs, in terms of PDCCH blocking rate and scheduling flexibility, shall not be degraded as much as possible. On the other hand, for the first type of UEs, it is advantageous that the number of candidates may be small so that PDCCH detection does not cost too much effort to the first type of UEs, which is also beneficial for power saving.

In LTE enhanced Machine Type Communication (eMTC)/Internet of Things (IoT), PDCCH may be repeated in multiple subframes based on the configuration of the BS. The search space is defined on the repeated subframes. A PDCCH candidate may be defined as {L, R}, wherein L is the aggregation level and R is the repetition number, or the repetition level.

In LTE, the PDCCH for the normal LTE UEs and for the MTC/IoT UEs are configured separately and transmitted in different resources. There is no DCI that is targeted for both the eMTC/IoT UEs and the normal UEs. The search space is designed such that the aggregation levels and the candidates of each aggregation level are the same in the repeated subframes.

The present disclosure proposes a search space set for a first type of UEs, e.g., the RedCap UEs defined at least partially on the PDCCH monitoring occasions that are configured for the a second type of UEs, e.g., legacy eMBB and URLLC UEs, and impacts the second type of UEs as less as possible at the same time. Specifically, the present disclosure proposes the search space design for efficient PDCCH reception in case of PDCCH repetition, with separately configured AL or candidates in different search space subsets of PDCCH monitoring occasions, which are different from the principle of LTE eMTC/IoT search space design.

Specifically, suppose that the search space set is defined on R PDCCH monitoring occasions. The maximum PDCCH repetition number is R. The present disclosure proposes to divide the R PDCCH monitoring occasions into $R_1$ PDCCH monitoring occasions and $R_2$ PDCCH monitoring occasions, i.e. $R=R_1+R_2$, $R_1$ or $R_2$ is an integer number which is smaller than or equal to R, i.e. $R_1 \leq R$, or $R_2 \leq R$.

In one preferred embodiment, the $R_1$ PDCCH monitoring occasions are the PDCCH monitoring occasions originally configured for the second type of UEs, e.g., legacy eMBB or URLLC UEs, and the $R_1$ PDCCH monitoring occasions are proposed to be shared by both the first type of UEs and the second type of UEs. The $R_2$ PDCCH monitoring occasions are configured delicately for the first type of UEs, e.g., RedCap UEs. Accordingly, the search space set for the first type of UEs is defined over two sets of PDCCH monitoring occasions, one set shared by both the first type of UEs and the second type of UEs, and the other set is dedicated for the first type of UEs.

In another preferred embodiment, the search space set for first type of UEs is defined fully on the PDCCH monitoring occasions configured for the second type of UEs. That is, the R PDCCH monitoring occasions are all originally configured for the second type of UEs, and the R PDCCH monitoring occasions are divided into $R_1$ PDCCH monitoring occasions and $R_2$ PDCCH monitoring occasions.

The search space set for the first type of UEs contains at least one of the following three search space subsets, wherein each subset may include the following parameters: AL and the total number of candidates, and may additionally include the repetition level:

Search space subset #1; subset #1 is defined over $R_1$ PDCCH monitoring occasions. The ALs and the candidates for each AL are configured for the $R_1$ PDCCH monitoring occasions, and the repetition level $L_1$ is determined by $R_1$. In one embodiment, the repetition level $L_1$ may be selected from a set including the following integer numbers: $\{1, 2, \ldots, R_1/k_1\}$, $k_1$ is an integer number that satisfies the following two conditions: $k_1$ ranges from 1 to $R_1$ and $R_1/k_1$ is also an integer. For instance, suppose R is 4, and $R_1$ is 2, then the repetition number may be 1 or 2. It should be noted that the repetition level $L_1$ may not be indicated in this subset, and is implicitly indicated by other manners. The candidate of subset #1 is determined by an AL in subset #1 and the repetition level $L_1$.

The ALs or candidates for the first type of UEs in $R_1$ PDCCH monitoring occasions are same with the ALs or candidates configured for the second type of UEs, or are configured to be a subset of those configured for the second type of UEs. If the ALs or candidates are not configured, then they are identical to the ALs or candidates configured for the second type of UEs, except the candidates of AL=1 and/or AL=2 in the legacy PDCCH monitoring occasions. The RedCap UEs will not detect the candidates of AL=1 and/or AL=2 in the legacy PDCCH monitoring occasions, since they are useless to RedCap UEs with less receiving antennas.

Search space subset #2; subset #2 is defined over $R_2$ PDCCH monitoring occasions. The ALs and the candidates for each AL are configured for the $R_2$ PDCCH monitoring occasions, and the repetition level $L_2$ is determined by $R_2$. In one embodiment, the repetition level $L_2$ may be selected from a set including the following integer numbers: $\{1, 2, \ldots, R_2/k_2\}$, $k_2$ is an integer number that satisfies the following two conditions: $k_2$ ranges from 1 to $R_2$ and $R_2/k_2$ is also an integer. For instance, suppose R is 4, and $R_2$ is 2, then the repetition number may be 1 or 2. It should be noted that the repetition level L, may not be indicated in this subset, and is implicitly indicated by other manners. The candidate of subset #2 is determined by an AL in subset #2 and the repetition level $L_2$.

The ALs or candidates for the first type of UEs in $R_2$ PDCCH monitoring occasions are configured to be another subset of those configured for the second type of UEs. That is, search space subset #2 is a set different from the search space subset #1. As one embodiment, if the ALs or candidates are not configured, then they are identical to the ALs or candidates configured for the second type of UEs, except the candidates of AL=1 and/or AL=2 in the legacy PDCCH monitoring occasions. As another embodiment, if the ALs or candidates are not configured, then they are identical to the ALs or candidates configured for the first search space subset for the first type of UEs. The RedCap UEs will not detect the candidates of AL=1 and/or AL=2 in the legacy PDCCH monitoring occasions, since they are useless to RedCap UEs with less receive antennas. It should be noted that the ALs or candidates for the RedCap UEs in $R_2$ PDCCH monitoring occasions are configured independently from those in $R_1$ PDCCH monitoring occasions.

Search space subset #3; subset #3 is determined by all the search space subsets that are defined over a number of PDCCH monitoring occasions. That is, subset #3 is determined by subset #1 and subset #2. The ALs are determined by the ALs of the subset #1 and the ALs of the subset #2. The repetition level $L_3$ is $R_1+R_2$. The candidate of subset #3 is determined by an AL in subset #3 and the repetition level $L_3$.

For search space subset #3, the ALs and the corresponding candidate of subset #3 may include different candidates according to different options.

For the first option, the ALs in subset #3 are the ALs exist in both search space subset #1 and search space subset #2, in other words, the ALs in subset #3 is an intersection of the ALs in subset #1 and the ALs in subset #2. A candidate of subset #3 is determined by an AL in subset #3 and a repetition level of $R_1+R_2$.

For the second option, the ALs in subset #3 includes the ALs exist in both search space subset #1 and search space subset #2, that is, all the ALs determined according to the first option, and additionally, the ALs also include a combination of two different ALs, one from the ALs in subset #1 and the other one from the ALs in subset #2. Each candidate in the candidate set #3 is determined by one AL from subset #1 and another AL from subset #2, and the repetition level is $R_1+R_2$.

In the second option, there is an association between the two different ALs in the combination. This association relationship may be predefined, for example, in specification, or by the BS, or configured, or implicitly determined. For example, a smaller AL in subset #1, which is defined over $R_1$ PDCCH monitoring occasions shared by both the first type of UEs and the second type of UEs, is associated with a larger AL in subset #2, which is defined over $R_2$ PDCCH monitoring occasions configured only for the first type of UEs. For another example, a part of the candidates of a smaller AL in subset #1, which is defined over $R_1$ PDCCH monitoring occasions shared by both the first type of UEs and the second type of UEs, is associated with a candidate of a larger AL in subset #2.

In some other embodiments, the R PDCCH monitoring occasions may be divided into other numbers of PDCCH monitoring occasions, for example, the R PDCCH monitoring occasions may be divided into $R_1$ PDCCH monitoring occasions, $R_2$ PDCCH monitoring occasions, and $R_3$ PDCCH monitoring occasions, i.e. $R=R_1+R_2+R_3$, $R_1$, $R_2$, or $R_3$ is an integer number which is smaller than or equal to R, i.e. $R_1 \le R$, $R_2 \le R$, or $R_3 \le R$. In this case, the search space set for RedCap UEs contains at least one of the following four search space subsets: subset #1, subset #2, and subset #3, which are determined in a similar fashion as the above subset #1 and subset #2, and a subset #4, which is determined in a similar fashion as the above subset #3.

It should be noted, that the parameters in search space subset #1, search space subset #2, and search space subset #3, such as the ALs, the candidates, are configured separately from each other. The values of R, $R_1$, $R_2$, and/or $R_3$, may be configured by the BS and transmitted to the UE, or they may be predefined, or implicitly determined by the repetition level configured for the search space subset #3.

The search space configuration also considers the balance between low PDCCH blocking for the first type of UEs, e.g., RedCap UEs and low PDCCH monitoring effort for the first type of UEs.

In still other embodiments, there might be more than one sets of PDCCH monitoring occasions which are shared by both the first type of UEs and the second type of UEs, and might be more than one sets of PDCCH monitoring occasions which are dedicated for first type of UEs, thus the search space set for the first type of UEs is defined over these sets of PDCCH monitoring occasions. The present disclosure has no intention of limiting the total numbers of the sets.

In below examples, for illustration only, the RedCap UEs that need coverage enhancement are taken as the first type of UEs, and the legacy eMBB UEs or URLLC UEs that do not need coverage enhancement are taken as the second type of UEs. It should be noted this assumption is just for explaining the example.

FIG. 2 illustrates an example of the three search space subsets according to some embodiments of the present disclosure. In FIG. 2, the subset #3 is determined according to option 1, and a candidate for RedCap UE with PDCCH repetition is represented as (AL, R, #candidates), wherein AL represents the aggregation level, R represents the repetition level, and #candidates represents the total number of candidates. In FIG. 2, the search space set for legacy UEs is configured with ALs including {1, 2, 4, 8, 16} are configured for legacy UEs, and the candidates numbers for each AL are {8, 4, 4, 2, 1} respectively, and there is no repetition for each candidate.

The CORESET includes 16 Control Channel Elements (CCE), which are CCE0, CCE1, . . . , CCE15, respectively.

Based on the above configuration, the candidates for each AL for the legacy UEs are presented as follows:

For AL=1, the 8 candidates are:

i. candidate 0: CCE0;

ii. candidate 1: CCE1;

iii. candidate 2: CCE2:

iv. candidate 3: CCE3;

v. candidate 4: CCE4;

vi. candidate 5: CCE5;

vii. candidate 6: CCE6 and viii. candidate 7: CCE7;

For AL=2, the 4 candidates are:

i. candidate 0: CCE0~CCE1;

ii. candidate 1: CCE2~CCE3;

iii. candidate 2: CCE4~CCE5;

iv. candidate 3: CCE6~CCE7;

For AL=4, the 4 candidates are:

i. candidate 0: CCE0~CCE3;

ii. candidate 1: CCE4~CCE7;

iii. candidate 2: CCE8~CCE11;

iv. candidate 3: CCE12~CCE15;

For AL=8, the 2 candidates are:

i. candidate 0: CCE0~CCE7;

ii. candidate 1: CCE8~CCE15;

For AL=16, the 1 candidate is:

i. candidate 0: CCE0~CCE15.

For RedCap UEs, the search space set contains three subsets. The subset #1 is defined over $R_1$ PDCCH monitoring occasions, and is configured as a subset of those for legacy UEs in PDCCH monitoring occasions for legacy UEs. and the ALs including {4, 8, 16} are configured in the abovementioned search space subset #1, the candidates numbers for each AL are {2, 2, 1} respectively, and there is no repetition for each candidate. The candidates for RedCap UE with PDCCH repetition includes (4, $R_1$, 2), (8, $R_1$, 2), and (16, $R_1$, 1), and $R_1$=1. The candidates of subset #1 are configured as a subset of candidates for legacy UEs in the R PDCCH monitoring occasions, and include {2, 2, 1} candidates for the AL with values of {4, 8, 16} respectively.

Based on the above configuration, the candidates for each AL in candidate set #3 are presented as follows:

For AL=4, the 2 candidates are:

i. candidate 0: CCE0~CCE3;

ii. candidate 1: CCE4~CCE7;

For AL=8, the 2 candidates are:

i. candidate 0: CCE0~CCE7;

ii. candidate 1: CCE8~CCE15;

For AL=16, the 1 candidate is:

i. candidate 0: CCE0~CCE15.

The subset #2 candidates are configured in $R_2$ PDCCH monitoring occasions, which are dedicated for RedCap UEs, and contains another subset of the candidates for legacy UEs, i.e., {2, 1} candidates for the AL with values of {8, 16} respectively. The candidates for RedCap UE with PDCCH repetition include (8, $R_2$, 2), and (16, $R_1$, 1), and $R_2$=1.

The ALs including {8, 16} are configured in the abovementioned search space subset #2, and the candidate numbers for each AL are {2, 1} respectively. Based on the above configuration, the candidates for each AL in candidate set #2 are presented as follows:

For AL=8, the 2 candidates are:

i. candidate 0: CCE0~CCE7;

ii. candidate 1: CCE8~CCE15;

For AL=16, the 1 candidate is:

i. candidate 0: CCE0~CCE15.

The subset #3 candidates are configured to be repeated in the PDCCH monitoring occasions for legacy UEs and in the PDCCH monitoring occasions dedicated for RedCap UEs. Based on option 1, the AL or candidates for subset #3 are the overlapped ALs or candidates in the subset #1 and subset #2, i.e., AL {8, 16} with {2, 1} candidates, and the repetition level is $R_1$+$R_2$, which is 2. In other words, an AL in subset #3 are an AL that exists in both search space subset #1 and search space subset #2, therefore, the candidates for each AL in candidate set #3 are presented as follows:

For AL=8, the 2 candidates are:

i. candidate 0: candidate 0 for AL=8 from the candidates set #1 and candidate 0 for AL=8 from the candidates set #2;

ii. candidate 1: candidate 1 for AL=8 from the candidates set #1 and candidate 1 for AL=8 from the candidates set #2;

For AL=16, the 1 candidate is:

i. candidate 0: candidate 0 for AL=16 from the candidates set #1 and candidate 0 for AL=16 from the candidates set #2.

Regarding the search space subset #3, for the second option, the AL in subset #3 are the ALs exist in both search space subset #1 and search space subset #2, and a combination of two different ALs, one from the ALs in subset #1 and the other one from the ALs in subset #2, and the repetition level is $R_1$+$R_2$, which is 2. Therefore, the candidate for each AL in candidate set #3 are presented as follows:

For AL=8, the 2 candidates are:

i. candidate 0: candidate 0 for AL=8 from the candidates set #1 and candidate 0 for AL=8 from the candidates set #2;

ii. candidate 1: candidate 1 for AL=8 from the candidates set #1 and candidate 1 for AL=8 from the candidates set #2.

For AL=16, the 1 candidate is:

i. candidate 0: candidate 0 for AL=16 from the candidates set #1 and candidate 0 for AL=16 from the candidates set #2.

For AL which is a combination of two different ALs, one from the ALs in subset #1 and the other one from the ALs in subset #2, for example, AL=4 in subset #1 and AL=8 in subset #2, the two candidates are:

i. candidate 0: candidate 0 for AL=4 from the subset #1 and candidate 0 for AL=8 from the subset #2; and ii. candidate 1: candidate 0 for AL=4 from the subset #1 and candidate 0 for AL=8 from the subset #2.

As can be seen, the above configuration take the association between the AL from subset #1 and the AL from subset #2 into consideration, namely, the smaller AL, i.e. 4, which is configured over the PDCCH monitoring occasions for legacy UEs, is associated with a larger AL, i.e. 8, which is configured over the PDCCH monitoring occasions for RedCap UEs.

Table 1 further illustrates the search space set for legacy UEs and for RedCap UEs. Table 1 lists the search space set for legacy UEs and for RedCap UEs. The AL or candidates for both option 1 and option 2 for the subset #3 candidates are listed. For option 2, the AL with a value of 4 in the legacy PDCCH monitoring occasions is association with AL with a value of 8 in the dedicated PDCCH monitoring occasions, therefore one candidate is corresponding to an AL with a value of 4 in the legacy PDCCH monitoring occasions and an AL with a value of 8 in the dedicated PDCCH monitoring occasions. In this example, $R_2$=$R_1$.

TABLE 1

| Candidates for legacy UEs and for RedCap UEs | AL/candidates | Repetition level |
|---|---|---|
| Legacy UEs | AL 2, 8 candidates<br>AL 4, 4 candidates<br>AL 8, 2 candidates<br>AL 16, 1 candidate | 1 |
| RedCap UEs, subset #1 candidates (in PDCCH monitoring occasions for legacy UEs) | AL 4, 4 candidates<br>AL 8, 2 candidates<br>AL 16, 1 candidate | $R_1$ |
| RedCap UEs, subset#2 candidates (in PDCCH monitoring occasions dedicated for RedCap UEs) | AL 8, 2 candidates<br>AL 16, 1 candidate | $R_2 = R_1$ |
| RedCap UE, subset #3 candidates (in both PDCCH monitoring occasions for legacy UEs and PDCCH monitoring occasions dedicated for RedCap UEs), option 1 | AL 8, 2 candidates<br>AL 16, 1 candidate | $R_2 = 2 \times R_1$ |
| RedCap UE, subset #3 candidates (in both PDCCH monitoring occasions for legacy UEs and PDCCH monitoring occasions dedicated for RedCap UEs), option 2 | AL 8, 2 candidates<br>AL 16, 1 candidate<br>AL 4 (in PDCCH monitoring occasions for legacy UEs), AL8 (in PDCCH monitoring occasions for legacy UEs), 4 candidates | $R_2 = 2 \times R_1$ |

Based on the above, the BS may flexibly determine an AL or candidate for transmitting the scheduling DCI.

If the DCI is only targeting for legacy UEs, the BS could select one AL or candidate from the legacy configured AL or candidates for the DCI transmission.

If the DCI is only targeting for RedCap UEs, or targeting for both the RedCap UEs and legacy UEs, and if the BS determines that there is no need to perform PDCCH repetition, the BS could select one AL or candidate from subset #1 or subset #2.

Typically, if there is available candidate from subset #1, which is configured over the $R_1$ monitoring occasions for legacy UE, then the BS may select one AL or candidate from subset #1. In such case, the resource configured for dedicated PDCCH monitoring occasions could be saved and used for data transmission.

If there is no available candidate from subset #1, then the BS may select one AL or candidate from subset #2, which is configured over the $R_2$ monitoring occasions dedicated for RedCap UE. The RedCap UEs is scheduled in the dedicated PDCCH monitoring occasions; therefore there is no impact for legacy UEs in terms of PDCCH blocking and scheduling flexibility.

The BS may further select candidates based on whether PDCCH repetition is needed. For example, suppose $R_2=R_1=1$, then in table 1, subset #1 and subset #2 are configured with no repetition, and subset #3 is configured with two repetitions. If the BS determines that repetition is needed, then the BS shall select one candidate from subset #3.

In one embodiment, the BS may configure the subset #1 and subset #2 to the UE, and the UE determines the subset #3, then determines the candidates for each subset, and performs PDCCH monitoring with these candidates. Alternatively, the BS may configure the subset #1, subset #2, and subset #3 to the UE, and the UE does not need to determine the subset #3. It should be noted that the repetition levels in the subsets may not be transmitted from the BS to the UE when the repetition levels are implicitly determined.

In one embodiment, the configuration of each subset for the RedCap UEs is included in the search space set configuration for the legacy UEs.

Figure 3A:
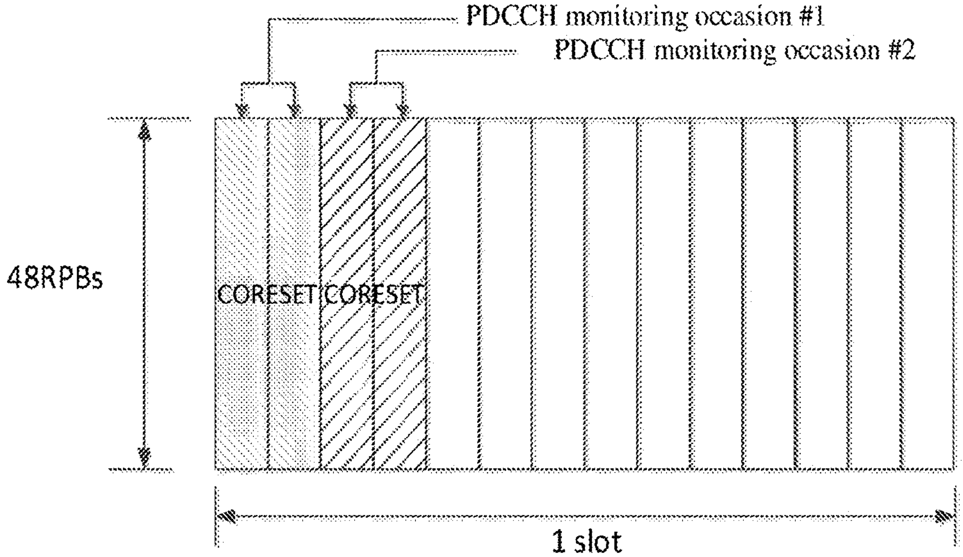
FIGS. 3*a* and 3*b* illustrate two manners of PDCCH repetition in two PDCCH monitoring occasions according to some embodiments of the present disclosure.
Figure 3B:
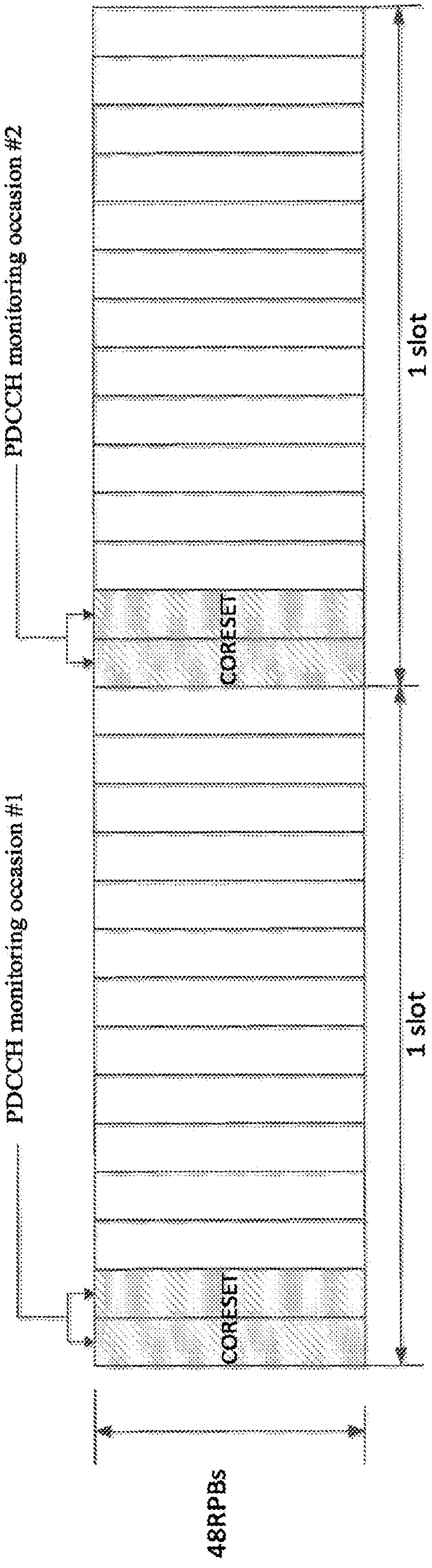

FIGS. 3*a* and 3*b* illustrate two manners of PDCCH repetition in two PDCCH monitoring occasions according to some embodiments of the present disclosure. In FIGS. 3*a* and 3*b*, the CORESET has a size of 48 PRBs in frequency domain and 2 OFDM symbols in time domain. In FIG. 3*a*, the first and the second symbols in one slot (which has a size of 14 OFDM symbols), is used to for PDCCH monitoring occasion #1, and the third and the fourth symbols in one slot, is used to for PDCCH monitoring occasion #2. In one embodiment, the PDCCH monitoring occasion #1 is configured for legacy UEs, and is shared by both the legacy UEs and the RedCap UEs. The PDCCH monitoring occasion #2 is configured delicately for RedCap UEs. FIG. 3*a* only depicts two PDCCH monitoring occasions, it should be noted that more PDCCH monitoring occasions may be included in one slot.

The PDCCH monitoring occasion #1 may be configured by a signaling in searchSpaceConfig, for example, the signaling may be monitoringSymbolsWithinSlot as define in 3GPP documents. The signaling has a value of '0b10000000000000', the two symbols '0b' indicate that the following bits are a bitmap, and the first bit in the bitmap is '1', which indicates the starting symbol of the PDCCH monitoring occasion #1 is the first symbol, symbol 0.

Regarding the PDCCH monitoring occasion #2, which is newly proposed in the present disclosure, and a new signaling is correspondingly proposed for indicating this occasion, may be named as additionalMonitoringSymbolsWithinSlot. The new signaling indicates the starting OFDM symbols for the dedicated PDCCH monitoring occasions. This signaling may be configured to have a similar format with the present signaling monitoringSymbolsWithinSlot, nevertheless, the signaling may be configured to have other formats.

In FIG. 3*a*, the signaling has a value of '0b00100000000000', the first '0b' indicates that the following bits are a bitmap, and the third bit in the bitmap is '1', which indicates the starting symbol of the PDCCH monitoring occasion #1 is the third symbol, symbol 2.

In FIG. 3*b*, the PDCCH repetition is inter-slot repetition, that is, the PDCCH monitoring occasion #1 is within the first slot, and the PDCCH monitoring occasion #2 is within the second slot.

Figure 4:
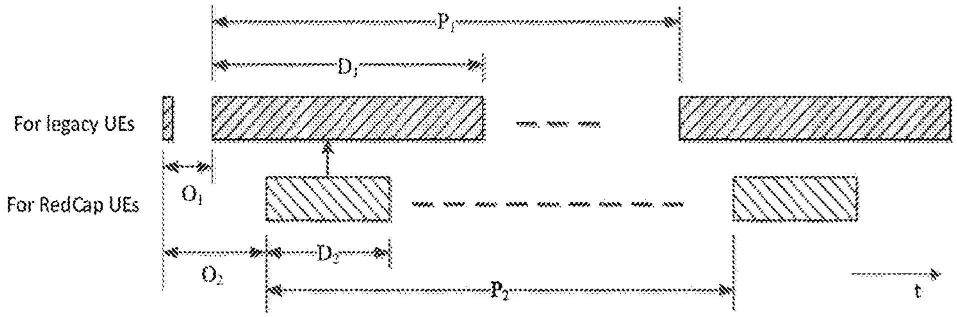
FIG. 4 illustrates the offset, duration, periodicity of the search space set for RedCap UEs according to some embodiments of the present disclosure.

FIG. 4 illustrates the offset, duration, periodicity of the search space set for RedCap UEs according to some embodiments of the present disclosure. These parameters for the RedCap UEs may be configured separately, or configured with the ALs or candidates. In FIG. 4, the offset, duration, periodicity of the search space set for legacy UEs are represented with $O_1$, $D_1$, and $P_1$, respectively; and the offset, duration, periodicity of the search space set for RedCap UEs are represented with $O_2$, $D_2$, and $P_2$, respectively. In the present disclosure, the search space set for RedCap UEs is configured as a subset of that configured for legacy UEs. Based on these configurations, the relationship of these parameters may be as follows:

$$D_1 <= D_2;$$

$P_2$ is an integral multiple of $P_1$; and $$O_1 =< O_2 <= O_1 + D_1 - D_2.$$

If the offset, duration, periodicity of the search space set for RedCap UEs are not configured, then these parameters of the search space set for the RedCap UEs follow the correspondingly configurations for legacy UEs.

Figure 5:
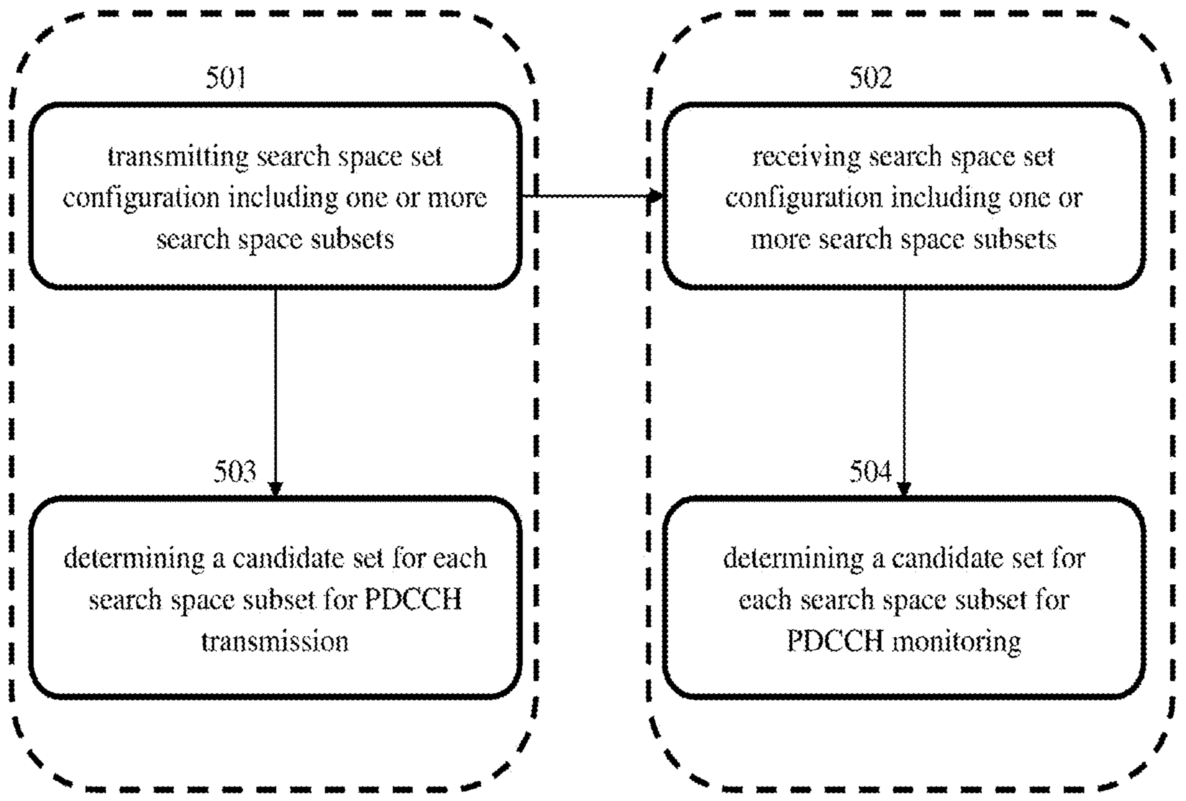
FIG. 5 illustrates a flow chart of a method for PDCCH monitoring according to some embodiments of the present disclosure.

FIG. 5 illustrates a flow chart of a method for PDCCH monitoring according to some embodiments of the present disclosure.

In step 501, the BS transmits search space set configuration including one or more search space subsets. Correspondingly, in step 502, the UE receives the search space set configuration including one or more search space subsets. In step 503, the BS determines a candidate set for each search space subset for PDCCH transmission, and in step 504, the UE determines a candidate set for each search space subset for PDCCH monitoring.

For example, the BS may transmit the search space set configuration including the subset #1 and subset #2 in FIG. 2 to the UE. Additionally, the BS may also transmit an additional search space subset, for example, subset #3, which is configured for at least two PDCCH monitoring occasion groups to the UE. Alternatively, the UE may determine the additional search space subset, i.e. subset #3, based on the one or more search space subsets, for instance the received subset #1 and subset #2. The subset #3 is associated with a repetition level, and each of the received one or more search space subsets, i.e. subset #1 and subset #2, is determined by the repetition level associated with subset #3.

In one embodiment, the additional search space subset, i.e. subset #3, includes an AL which is included in each of the one or more search space subsets, i.e. an AL included in subset #3 is included in both the subset #1 and subset #2. The candidate set for subset #3 includes at least a candidate which is associated with an AL, and a repetition level, and is a combination of at least two candidates for the at least two PDCCH monitoring occasion groups, and wherein the at least two candidates are associated with a same aggregation level. The additional search space subset includes an aggregation level which is a combination of different aggregation levels included in the one or more search space subsets, for example, in the solution of FIG. 2, the AL in subset #3 may include an AL=4 from the subset #1 and an AL=8 from the subset #2.

In another embodiment, the additional search space subset, i.e. subset #3, includes an AL which is a combination of different ALs included in the one or more search space subsets, that is, an AL included in subset #3 is a combination of two different ALs included in subset #1 and subset #2. The combination of different ALs includes a first AL associated with a PDCCH monitoring occasion group dedicated for the RedCap UE, and a second AL associated with a PDCCH monitoring occasion group shared by the legacy UE and the RedCap UE. A candidate set for subset #3 includes at least a candidate which is a combination of at least two candidates for the at least two PDCCH monitoring occasion groups, and the at least two candidates are associated with a same aggregation level and have a same candidate sequence, for example, a candidate in subset #3 may be: candidate 0 for AL=4 from the subset #1 and candidate 0 for AL=8 from the subset #2.

In one embodiment, an AL associated with the RedCap UE is larger than an AL associated with the legacy UE.

In one embodiment, the PDCCH monitoring occasion group may include a first PDCCH monitoring occasion group shared by the RedCap UE and the legacy UE; the PDCCH monitoring occasion group may include another PDCCH monitoring occasion group dedicated for the RedCap UE.

In another embodiment, a search space subset for a PDCCH monitoring occasion group dedicated for the RedCap UE is a subset of a search space subset for a PDCCH monitoring occasion group dedicated for a legacy UE.

In some embodiments, the repetition level in the search space set is determined by a repetition level of a corresponding PDCCH monitoring group and an integer set, for example, the repetition level $L_1$ may be selected from a set including the following integer numbers: $\{1, 2, \ldots, R_1/k_1\}$, $k_1$ is an integer number ranges from 1 to $R_1$ and $R_1/k_1$ is also an integer.

Regarding the parameters such as a duration, a periodicity; and/or an offset of each search space subset, they are configured independently, for example, these parameters for subset #1 and subset #2 are configured independently. The duration of a search space subset dedicated for the RedCap UE, is a subset of a duration of a search space subset dedicated for the legacy UE. The periodicity of a search space subset dedicated for the RedCap UE, is an integer multiple of a periodicity of a search space subset dedicated for the legacy UE.

Figure 6:
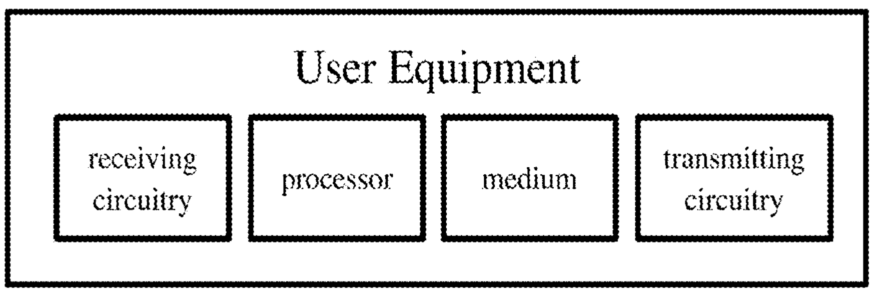
FIG. 6 illustrates a block diagram of a UE according to some embodiments of the present disclosure.

FIG. 6 illustrates a block diagram of a UE according to some embodiments of the present disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 5) with the receiving circuitry, the transmitting circuitry and the processor.

Figure 7:
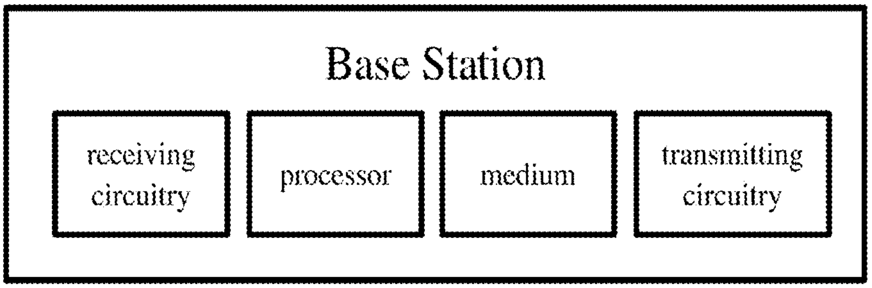
FIG. 7 illustrates a block diagram of a BS according to some embodiments of the present disclosure.

FIG. 7 illustrates a block diagram of a BS according to some embodiments of the present disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 5) with the receiving circuitry, the transmitting circuitry and the processor.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an." or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a first type of user equipment (UE), comprising:

receiving a search space set configuration including one or more search space subsets, wherein each search space subset includes at least one aggregation level and a total number of candidates associated with each aggregation level, each search space subset is independently configured for a Physical Downlink Control Channel (PDCCH) monitoring occasion group including at least one PDCCH monitoring occasion, and the one or more search space subsets include an additional search space subset configured for at least two PDCCH monitoring occasion groups; and determining a candidate set for each search space subset for PDCCH monitoring.

2. The method of claim 1, further comprising:

determining an additional search space subset based on the one or more search space subsets, wherein the additional search space subset is associated with a repetition level.

3. The method of claim 2, wherein each of the one or more search space subsets is associated with a repetition level determined by the repetition level of the additional search space subset.

4. The method of claim 1, wherein an aggregation level associated with the first type of UE is larger than an aggregation level associated with a second type of UE.

5. An apparatus for wireless communication, comprising:

at least one memory;

at least one processor coupled with the at least one memory and configured to cause the apparatus to:

receive a search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion, and the one or more search space subsets include an additional search space subset configured for at least two PDCCH monitoring occasion groups; and determine a candidate set for each search space subset for PDCCH monitoring.

6. The apparatus of claim 5, wherein the at least one processor is configured to cause the apparatus to:

determine an additional search space subset based on the one or more search space subsets, wherein the additional search space subset is associated with a repetition level.

7. The apparatus of claim 6, wherein each of the one or more search space subsets is associated with a repetition level determined by a repetition level of the additional search space subset.

8. The apparatus of claim 6, wherein the additional search space subset includes an aggregation level included in each of the one or more search space subsets.

9. The apparatus of claim 8, wherein a candidate set for the additional search space subset includes at least a candidate that is associated with an aggregation level, and a repetition level, and is a combination of at least two candidates for at least two PDCCH monitoring occasion groups, and wherein the at least two candidates are associated with a same aggregation level.

10. The apparatus of claim 6, wherein the additional search space subset includes an aggregation level that is a combination of different aggregation levels included in the one or more search space subsets.

11. The apparatus of claim 10, wherein the apparatus is a first type of user equipment (UE) and the combination of different aggregation levels includes a first aggregation level associated with a PDCCH monitoring occasion group dedicated for the first type of UE, and a second aggregation level associated with a PDCCH monitoring occasion group shared by the first type of UE and a second type of UE.

12. The apparatus of claim 10, wherein a candidate set for the additional search space subset includes at least a candidate which is a combination of at least two candidates for at least two PDCCH monitoring occasion groups, and wherein the at least two candidates are associated with a same aggregation level and have a same candidate sequence.

13. The apparatus of claim 5, wherein the apparatus is a first type of user equipment (UE) and an aggregation level associated with the first type of UE is larger than an aggregation level associated with a second type of UE.

14. The apparatus of claim 5, wherein the apparatus is a first type of user equipment (UE) and the PDCCH monitoring occasion group includes a first PDCCH monitoring occasion group shared by both the first type of UE and a second type of UE.

15. The apparatus of claim 5, wherein the apparatus is a first type of user equipment (UE) and the PDCCH monitoring occasion group includes a second PDCCH monitoring occasion group dedicated for the first type of UE.

16. The apparatus of claim 5, wherein the apparatus is a first type of user equipment (UE) and a search space subset for a PDCCH monitoring occasion group dedicated for the first type of UE is a subset of a search space subset for a PDCCH monitoring occasion group dedicated for a second type of UE.

17. A base station for wireless communication, comprising:

at least one memory;

at least one processor coupled with the at least one memory and configured to cause the base station to:

transmit a search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion, and the one or more search space subsets include an additional search space subset configured for at least two PDCCH monitoring occasion groups; and determine a candidate set for each search space subset for PDCCH monitoring.

18. The base station of claim 17, wherein a repetition level in the search space set is determined by a repetition level of a corresponding PDCCH monitoring group and an integer set.

19. A method performed by a base station, the method comprising:

transmitting a search space set configuration including one or more search space subsets, wherein each search space subset includes at least one aggregation level and a total number of candidates associated with each aggregation level, and wherein each search space subset is independently configured for a Physical Downlink Control Channel (PDCCH) monitoring occasion group including at least one PDCCH monitoring occasion, and the one or more search space subsets include an additional search space subset configured for at least two PDCCH monitoring occasion groups; and determining a candidate set for each search space subset for PDCCH monitoring.

20. The method of claim 19, further comprising:

determining an additional search space subset based on the one or more search space subsets, wherein the additional search space subset is associated with a repetition level.

* * * * *